United States Patent Office 3,649,398
Patented Mar. 14, 1972

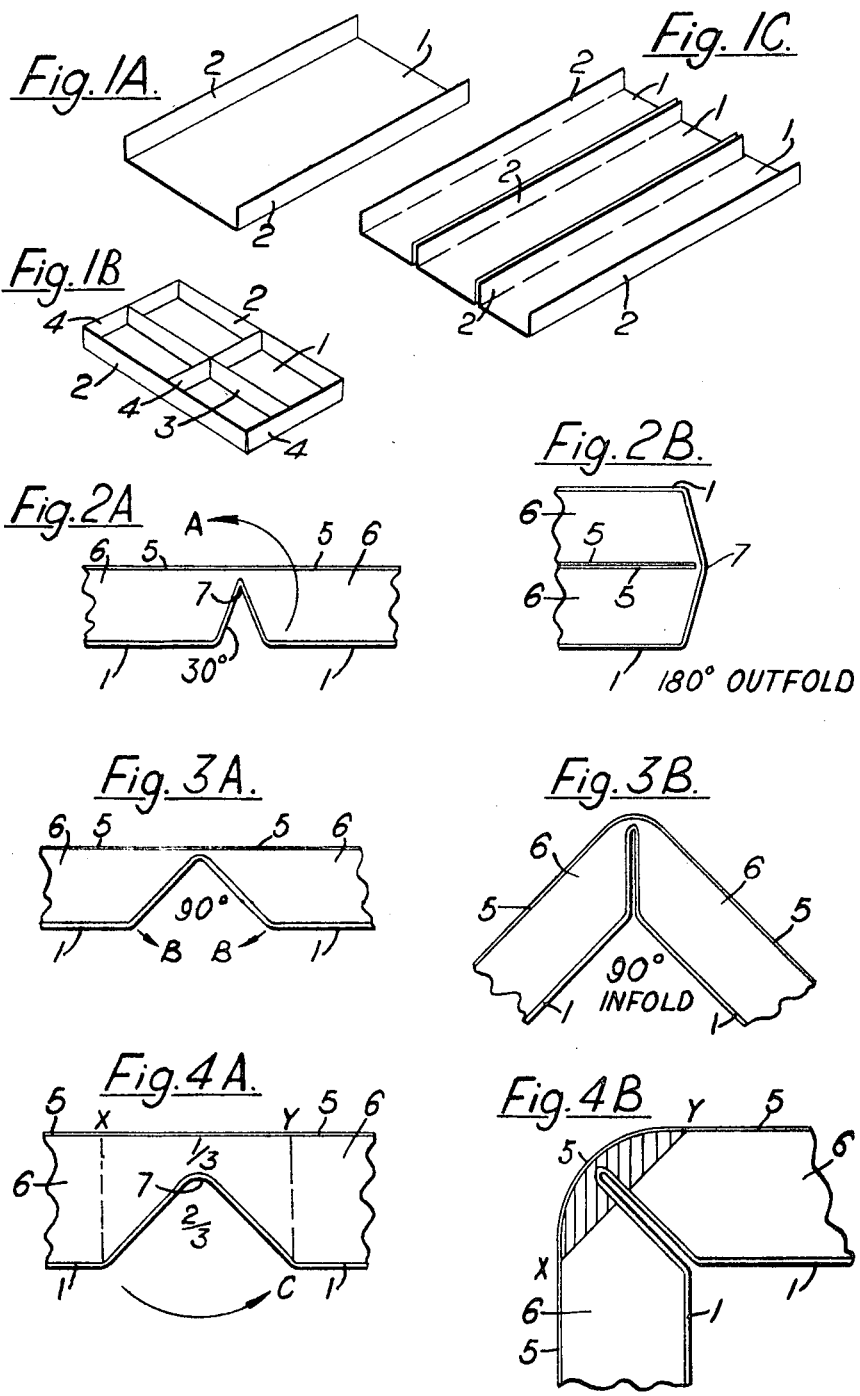

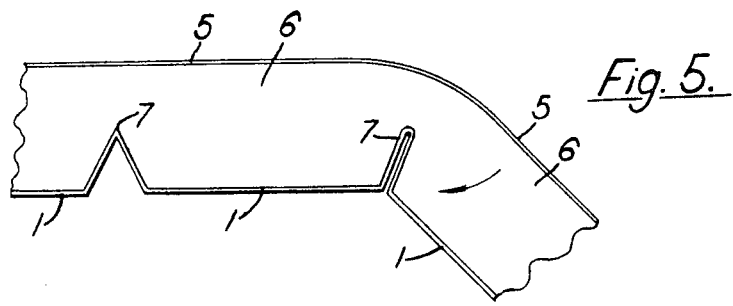
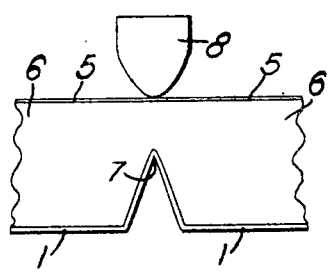
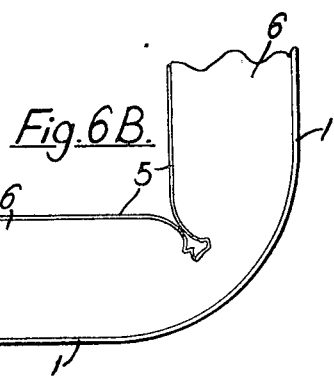
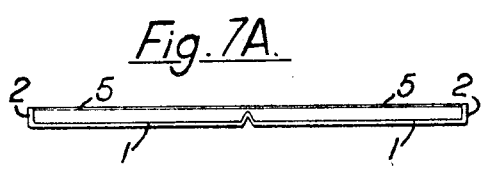
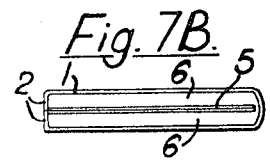
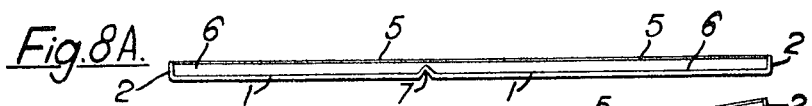
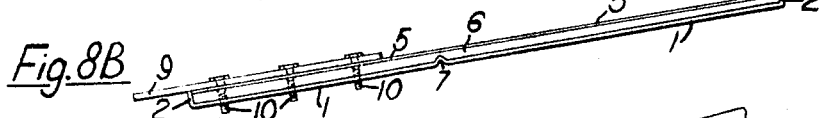

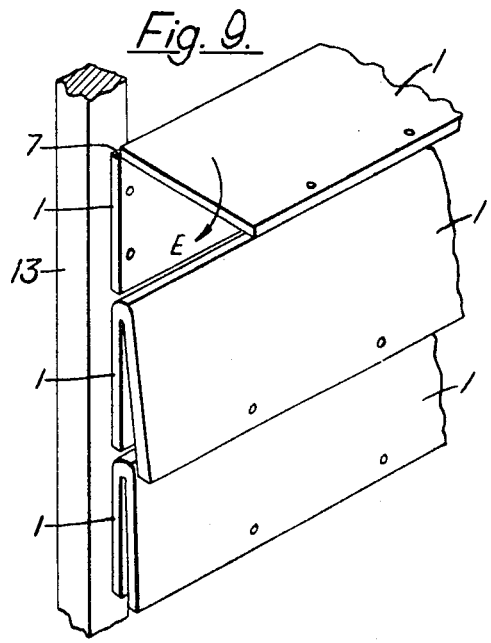
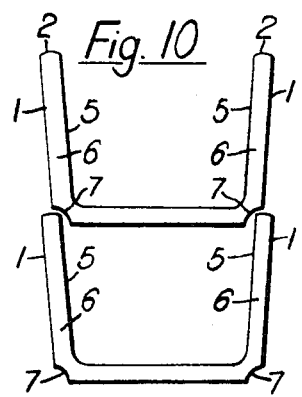
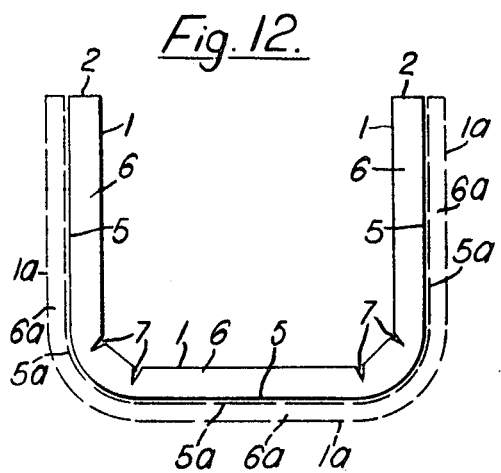
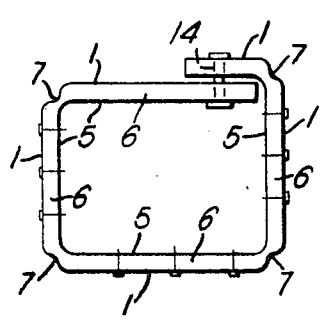

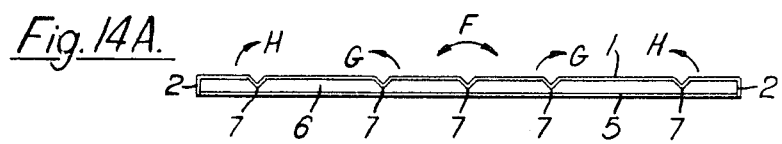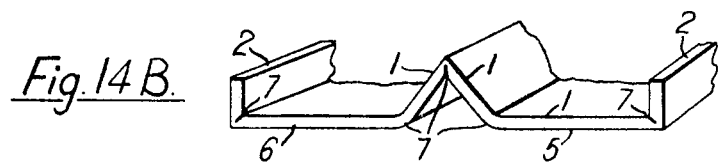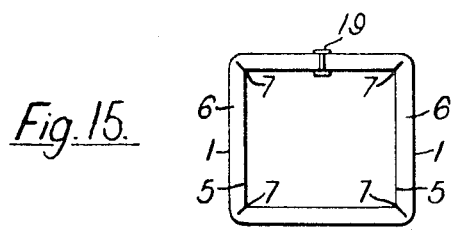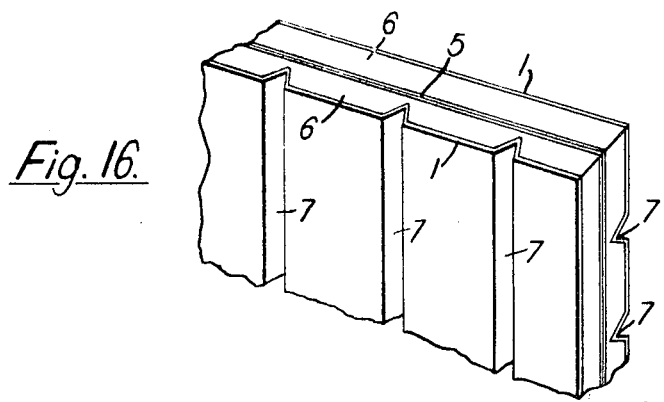

3,649,398
FOLDABLE FOAM LAMINATES
Donald George Keith, Stockton-on-Tees, England, assignor to Imperial Chemical Industries Limited, London, England
Filed Aug. 4, 1969, Ser. No. 847,021
Claims priority, application Great Britain, Sept. 4, 1968, 42,040/68
Int. Cl. B32b 5/20
U.S. Cl. 156—79        12 Claims

ABSTRACT OF THE DISCLOSURE

A method of making foldable laminate comprising a rigid layer of a foamed synthetic polymer confined between a flexible upper skin and a lower skin, the lower skin being provided with at least one upstanding notch of inverted V-shape the apex of which extends through the foam layer to a point below the upper skin, the laminate being foldable in a hinge-like manner about said apex, said method includes foaming said polymer and then pressing same in a tacky condition upon a preformed flexible film having the desired configuration.

The present invention relates to foam laminates of the kind comprising a rigid layer of foam (in particular foamed polyurethane) confined between two skins. Foam laminates of the kind described are useful as light-weight structural units and insulating material (e.g. in the building and packaging industries), and various processes for their manufacture have been proposed, for example in prior British Pats. Nos. 997,086, 1,098,472, 1,098,473 and 1,053,192 (the latter British patent corresponding to U.S. application Ser. No. 838,003 of Keith et al., now U.S. Pat. 3,537,929, which application is a continuation of application Ser. No. 458,237 filed May 24, 1965).

In particular, said prior British Pat. No. 1,053,192 describes and claims a process for the continuous manufacture of foam laminates consisting of a foam layer of uniform texture confined between two skins of differing predetermined surface contours which process comprises passing a first flexible skin having a surface of a predetermined desired shape continuously through guiding means underneath a foam dispenser, depositing an even layer of nascent foam on said first skin, while the latter either is sufficiently rigid in itself or by means of supports is made sufficiently rigid to impart its own shape to the underside of the foam, causing said foam layer to rise while travelling with said first skin, to adhere to it and to set to such consistency that essentially it ceases to flow under the force of gravity, inverting said first skin-and-foam-layer laminate while the foam is still tacky and impressing the tacky foam surface on to a second skin having a non-planar surface of a predetermined desired shape and travelling at the same speed and in the same direction as and in close proximity to and underneath the inverted first skin-foam laminate and causing said foam to fully cure and bond to both skins. According to said prior British Pat. No. 1,053,192, the nascent foam may be a polyurethane foam, or the foam may be formed from polystyrene, polyvinylidene chloride, urea formaldehyde, epoxy resins or polyethylene. Further, according to said patent, said second non-planar skin onto which the foam is inverted, may be a metal sheet having reinforcing grooves or reinforcements, and said first flexible skin may be, inter alia, a continuous paper sheet, plastic film, sheet metal, metal foil (e.g. aluminium foil), or a sheet of textile-reinforced plastic comprising a woven or non-woven textile substrate made of a material selected from the group consisting of cotton, jute, rayon, nylon, polyethylene terephthalate, glass fibre and polypropylene and mixtures thereof, bonded with and at least partly embedded in a flexible plastic material selected from the group consisting of polyvinyl chloride, nitrocellulose, acrylonitrile-butadiene-styrene co-polymers and natural and synthetic rubbers formulated with plasticisers, stabilisers, antioxidants, fillers and other additives for said textile-reinforced plastic sheet.

In the process of said prior British Pat. No. 1,053,192, as the foam is inverted onto the second non-planar skin (which is preferably, but not necessarily, a metal skin) it is still a gel, and it has now been observed that if the non-planar skin is formed or provided with one or more upstanding ribs or the like, these simply slice through the gel and the resulting laminate is thus provided with internal ribs embedded in the foam. This is most clearly demonstrated in FIGS. 1A, 1B and 1C of the accompanying drawings, both of which illustrate non-planar sheets, preferably metal sheets, onto which the foam may be inverted. In FIG. 1A, the sheet 1 is provided, at each edge thereof, with a narrow vertical rib 2 which slices through the foam which is thus able completely to fill the pan-shaped sheet 1, and serves to protect, cover and confine the foam within the sheet; this idea is carried further in FIG. 1B wherein, in addition to the side ribs 2, there are provided additional foam-slicing longitudinal and transverse ribs 3 and 4 respectively; FIG. 1C illustrates that a plurality of pans similar to that shown in FIG. 1A can be foam-filled simultaneously or successively depending, respectively, on whether their foam-slicing ribs 2 are parallel or transverse to the direction of travel of the pans. In all the pans as illustrated in FIGS. 1A, 1B, 1C, the vertical ribs are sufficiently tall to slice through the whole of the foam up to the flexible skin thereabove, and they may even slice through the latter if they are both tall enough and sharp enough.

More importantly, however, it has now been discovered that if the intermediate pairs of adjacent ribs 2 of adjacent pans 1 (as illustrated in FIG. 1C) are not sufficiently tall to slice right through to the top of the foam, the two outer pans 1 may be folded upwardly and inwardly with respect to the central pan 1, using the unsliced portion of the foam as a hinge. This is possible whether the pans shown in FIG. 1C are three separate, individual pans or whether they have been formed integrally with each other by folding a sheet of metal or the like to form a multiple pan having the general shape shown in FIG. 1C. Carrying this discovery one step further, it has also been discovered that if a sheet 1 is provided, longitudinally or transversely, with at least one upstanding crimp or notch of inverted V-shape, the apex of the inverted V will slice the foam in the same way as the vertical ribs of FIGS. 1A, 1B and 1C and, furthermore, that if the inverted V is not so tall as to slice right through to the top of the foam and sever the flexible skin thereabove, it can be used as a hinge about which the laminate can be folded either outwardly (as illustrated in FIGS. 2A and 2B) or inwardly (as illustrated in FIGS. 3A and 3B).

FIG. 2A illustrates part of a laminate having a rigid layer of foam 6 (for example polyurethane foam) sandwiched between an upper flexible skin 5 (for example paper, in particular polyolefin-coated paper) and a lower metal sheet 1 which is crimped or otherwise provided with an inverted V-shaped notch 7 which does not quite reach to the top of the foam layer 6. In this case, the angle of the V is relatively acute (e.g. about 30°, or preferably less) and the laminate is "outfolded" through 180°, as indicated by the arrow A, using the apex of the inverted V as a hinge, to produce a double rigid laminate in which both the outer faces 1 are metal. The intermediate pairs of adjacent ribs 2, described in the immediately preceding paragraph and illustrated in FIG. 1C, represent to extreme case where the angle of the V is zero; it is appreciated that this is not strictly a V-shape, but since it is convenient and simple to refer herein to "V-shaped crimps or notches" it is intended that this phrase should cover crimps or notches where the angle of the V is zero, or substantially zero, as in FIG. 1C. (Although not illustrated in FIG. 2A, the two outer edges of the metal sheet 1 may each be provided with upstanding edge and/or and rib such as 2 and 4 in FIG. 1B, so that most or all of the six surfaces of the folded panel of FIG. 2B are metal. Prior to "outfolding," the upper flexible paper skin 5 may be coated with a suitable adhesive in order to strengthen the folded laminate.

FIG. 3A illustrates part of a laminate which is similar in every respect to that shown in FIG. 2A, except that the angle of the V is much greater, e.g. about 90°. In this case, the laminate is "infolded" as indicated by the arrows B, using the apex of the inverted V as a hinge until the sides of the hinge (which may previously have been coated with a suitable adhesive) meet as illustrated in FIG. 3B to form a laminate folded through 90°.

Although FIGS. 2B and 3B show the laminate "outfolded" and "infolded," respectively, through 180° and 90°, it will be appreciated that it may not always be desired to fold them to such an extent. Thus, for example, in FIG. 2B the laminate might be "outfolded" through 90° to form a right-angle; and in FIG. 3B, it might be desired to "infold" the laminate through, for example, only 45°, in which case the angle of the V in FIG. 3A would conveniently only be 45°.

It will be appreciated that when the foldable laminates according to the present invention are first manufactured (i.e. prior to folding, as shown in FIGS. 2A and 3A) they necessarily include the upper flexible skin 5. However, it may be desired to strip off the skin 5 before folding (particularly when "outfolding" through 180° as in FIG. 2B), in which case this can be done as described in said prior British Pat. No. 1,053,192.

It will also be appreciated that if the V-crimped sheets 1 for use in this invention are supplied with the crimps or notches 7 preformed therein, they will nest with one another very conveniently for storage. Otherwise, one or more suitable crimping tools may be used to impart the desired crimp or notch to an otherwise planar metal lower sheet 1 just prior to the application of the foam thereto. Although reference has been made, hereinabove, mainly to the lower skins being sheets of metal, the invention is also applicable to very flexible lower sheets, such as paper, plastics, fabrics or the like. To obtain the desired crimp or notch in such a case, the paper or like flexible lower skin may be fed to the process or machine so that it rests lightly upon an endless belt or the like, the surface of which is formed or provided with upstanding triangular ridges or like projections; as the foam is applied to the flexible lower skin it causes it to conform to the surface shape of the endless belt whose paper-covered upstanding triangular ridges or like projections simultaneously slice upwardly through the foam and impart the desired crimp or notch to the flexible lower skin of the resulting laminate.

Furthermore although, hereinabove, reference has been made particularly to the foam-inverting process of said prior British Pat. No. 1,053,192, the present invention can also use more conventional methods of applying the nascent foam onto the lower sheet (for example as in prior British Pat. No. 997,086) and allowing it to foam to a sliceable gel-like consistency around the upstanding V-notches of the lower sheet, before subsequently fully curing and bonding thereto.

The present invention accordingly provides a foldable foam laminate comprising a rigid layer of foam (in particular foamed polyurethane) confined between a flexible upper skin and a lower skin, said lower skin being foamed or provided with at least one upstanding crimp or notch of inverted V-shape between its two outer edges, the apex of said inverted V extending through said layer of foam to a point below said flexible upper skin. Preferably the angle subtended by said inverted V-shaped crimp or notch does not exceed about 90° to 120°. Said crimp or notch of inverted V-shape will normally extend longitudinally or transversely with respect to the length of the laminate, but for laminates of special design it may extend at an angle other than a right angle thereto, or even in a curved line. Preferably said lower skin is also provided, on at least one edge thereof, with an upstanding rib or the like in order to cover, protect and/or confine the foam layer; if said lower skin is formed from a discontinuous sheet material, it may also be provided, on at least one end thereof, with an upstanding rib or the like for the same purpose.

The present invention further provides structures, in particular structural units and insulating structures, comprising at least one foldable foam laminate as described in the immediately preceding paragraph, folded in a hinge-like manner about the apex of said inverted V-shaped crimp or notch.

The present invention also provides a process for the manufacture of a foldable foam laminate comprising a rigid layer of foam confined between a first upper flexible skin and a second lower skin which is formed or provided with at least one upstanding crimp or notch of inverted V-shape between its two outer edges, which comprises the steps of applying a nascent foam to the under-surface of said first upper skin and/or to the upper-surface of said second lower skin, positioning said skins one above the other and in close proximity to each other, and causing or allowing said foam to acquire a gel-like consistency whereby it is at least partially sliced-through by said inverted V notch, and subsequently causing or allowing said foam to fully cure and bond to both skins.

Foldable laminates according to the present invention are conveniently manufactured by a process according to or similar to the said prior British Pat. No. 1,053,192.

The present invention therefore further provides a process for the manufacture of a foldable foam laminate comprising a rigid layer of foam confined between two skins, which process comprises passing a first flexible skin through guiding means under a foam dispenser, depositing a layer of nascent foam on said first skin, causing said foam layer to rise while travelling with said first skin, to adhere to it and to set such consistency that essentially it ceases to flow under the force of gravity, inverting said first skin-and-foam-layer laminate while the foam is still tacky and impressing the tacky foam surface onto a second skin in close proximity to and underneath the first skin-foam laminate, said second skin comprising a sheet material formed or provided with at least one upstanding crimp or notch of inverted V-shape between its two outer edges, the apex of said inverted V extending to below said first flexible skin, and causing said foam to fully cure and bond to both skins.

The present invention further provides a process for the continuous manufacture of a foldable foam laminate consisting of a rigid layer of foam confined between two skins, which process comprises passing a first flexible skin continuously through guiding means underneath a foam dispenser, depositing a layer of nascent foam on said first skin, causing said foam layer to rise while travelling with said first skin, to adhere to it and to set to such consistency that essentially it ceases to flow under the force of gravity, inverting said first skin-and-foam-layer laminate while the foam is still tacky and impressing the tacky foam onto a second skin travelling at the same speed and in the same direction as and in close proximity to and underneath the inverted first skin-foam laminate, said second skin comprising a sheet formed or provided with at least one upstanding crimp or notch of inverted V-shape between its two outer edges, the apex of said inverted V extending to below the top of said layer of foam, and causing said foam to fully cure and bond to both skins.

The present invention also includes the step of folding a laminate, whenever produced by a process according to any of the three immediately preceding paragraphs, inwardly or outwardly in a hinge-like manner about the apex of said inverted V-shaped crimp or notch.

The extent to which the inverted V-shaped notch should occupy the depth of the foam layer, depends upon whether the laminate is to be "infolded" or "outfolded," the proposed angle through which it is to be folded, and the use to which the folded laminate is to be put.

Considering first the case of a 90° "infold," as illustrated in FIGS. 4A and 4B, if the notch 7 were to extend through the full depth of the foam layer 6 up to the skin 5, the hinge action would be simple. However, as the notch extends through less than the full depth of the foam layer, tensile forces will be exerted on the skin 5 and the foam layer 6 will be locally compressed when the laminate of FIG. 4A is "infolded" in the direction of the arrow C to assume the shape shown in FIG. 4B. If there is to be no stretch of the convex face of the skin 5 in the folded laminate of FIG. 4B, preferably not more than ⅓ of the foam thickness should remain unbroken; in other words a 90° notch should preferably extend at least ⅔ of the way through the depth of the foam layer 6. In FIGS. 4A and 4B, the straight line XY becomes the arc XY, and the average permanent compression of the foam over the shaded area is about 50%, leading to a corner of improved impact strength. An "infold" such as shown in FIG. 4B has little tendency to spring back, since the foam is crushed well past its yield point.

A 90° "infold" is therefore particularly useful when the notch 7 extends ⅔ of the way through the depth of the foam layer 6. In some uses, the fact that, under bent conditions, the metal "infold" nearly reaches the opposite skin 5 may be undesirable because the fold will act as a heat bridge. In such cases, two 45° notches 7 may then be used, as illustrated in FIG. 5, for in 45° notches the notch-depth may be somewhat less than ½ the thickness of the foam layer 6 without significant thermal loss being incurred.

Considering "outfolds," as shown in FIGS. 6A and 6B, the depth of the notch 7 may be as little as ⅔ the thickness of the foam layer 6, provided the bond line at the flat face 5 is loaded in compression (as indicated diagrammatically at 8) during folding. However, in "outfolds" a notch 7 of almost full foam thickness, as shown in FIG. 7A is preferred; under these conditions, it is simple to produce a full 180° "infold," as shown in FIG. 7B.

Foldable laminates in accordance with this invention are applicable to many fields of use, some of which will now be considered.

"OUTFOLDS"

"Outfolded" laminates will normally use a comparatively small-angled notch, extending through some ⅞ of the foam thickness. Such "outfolds" may be used in a variety of ways, some examples of which are given hereunder.

(a) Giant longspan pitched roofing board

This is illustrated in FIGS. 8A, 8B and 8C. FIG. 8A illustrates a foldable laminate in accordance with the present invention, and comprises a pan 48" wide, with a single V-notch 7 located 21" from one edge and filled with a foam layer 6 having a thickness of 1½". Such a panel may be used as a roofing module by applying to the shorter arm of the pan a steel strip 9 which projects beyond the edge 2 of the pan and is provided with bolts 10; the laminate is applied open to a portal frame 11 or the like and said shorter arm and steel strip 9 are bolted thereto by the bolts 10. The longer arm of the pan is then "outfolded" through 180° in the direction of the arrow D, using the notch 7 as a hinge, and self-tapped as shown at 12 to the projecting portion of the steel strip 9; if desired, an adhesive may be applied to the face 5 of the longer arm of the pan and/or to the upper surface of the steel strip 9 before "outfolding." Such a board has the following interesting properties, advantages and uses:

(i) Secret fixing
(ii) Fair internal and external metal faces
(iii) Spans between portal frames
(iv) Good flamespread on both faces
(v) Easy installation, with a cover width of 21"
(vi) Lengths of up to 14' will cover most of the market
(vii) Suitability for roofing and cladding.

The suitability of foldable laminates according to the present invention for wall cladding is illustrated in FIG. 9. Pan laminates as illustrated in FIG. 8A are used, the shorter arm of each pan being secured to a support 13 to form a flush internal wall and the longer arm of each pan being "outfolded" about the notch 7, in the direction of the arrow E, to form a lapped external wall. This arrangement is, of course, equally suitable for roofing. Apart from ease of erection, the arrangement is easily demountable and provides a completely dry internal or external wall cladding or roofing system.

(b) Crates, tote boxes, containers

These are illustrated in FIGS. 10 and 11. FIG. 10 illustrates nesting crates each formed by "outfolding," through about 90°, a laminate according to the present invention in which the sheet 1 is formed or provided with two V-notches 7. The container of FIG. 11 is formed by "outfolding," through about 90°, a laminate according to the invention in which the sheet 1 is formed or provided with four V-shaped notches 7 and only requires self-tapping, as shown at 14, in order to seal it.

"INFOLDS"

(a) Cold cabinet, appliance and vehicle industries

"Infolded" panels formed from laminates in accordance with the present invention offer a breakthrough in the cold cabinet, appliance, vehicle, and other industries where (as in FIGS. 4B and 5) the corners of the panels are required to have high impact strength and/or insignificant thermal loss. For example, the standard delicatessen counter body can be "infolded" directly from a 2" laminate in accordance with the present invention, as illustrated in FIG. 12, formed or provided with two pairs of V-notches 7, each of approximately 45° and half-foam thickness. Alternatively (though not illustrated) it can be "infolded" directly from a 2" laminate in accordance with the present invention, formed or provided with two V-notches 7, each of approximately 90° and ⅔ foam thickness. Very desirably, however, in the case of a delicatessen counter body formed from an "infolded" laminate as shown in FIG. 12, its outer surface is provided (for example by glueing or otherwise securing thereto) with a further insulating and/or decorative laminate, as indicated in dotted lines, which suitably comprises an outer metal panel 1a (having a smooth, decorative or otherwise pleasing appearance), a foam layer 6a, and a paper face 5a, which can be glued or otherwise applied directly to the face 5. The provisions of such an additional outer layer appreciably decreases thermal losses and increases the impact strength at the corners of the counter, where the thickness of the foam has been reduced by "infolding."

(b) Roofing

"Infold" laminates in accordance with the present invention are useful for flat roofing, as shown in FIGS. 13A and 13B. An "infold" pan laminate according to the present invention is provided with a V-notch 7, of approximately 90°, near each of its ends 2. To the underside 5 of the pan laminate, there is glued, or otherwise secured, an ordinary single rigid laminate (or SRL) generally designated 15 and comprising a metal, plywood or other rigid sheet 16, a foam layer 17 and, if desired an upper facing sheet of paper or the like (not shown). The single rigid laminate extends only from one V-notch 7 to the other. The two ends of the upper "infold" laminate are then "infolded" using the notches 7 as hinges to provide a roofing panel as shown in FIG. 13B which, as shown, may be connected to a similar roofing panel by conventional connecting means 18. In practice, the user would be expected to carry out the "infolding" in situ. Flat roofing panels, as illustrated in FIG. 13B, based on a 1" "infold" laminate according to the present invention and glued or otherwise secured, to a 2" SRL of metal or plywood, will span over 10 ft. under normal loadings.

Foldable laminates in accordance with the present invention are also particularly well suited to pitched roofing, as illustrated in FIGS. 14A and 14B. For example, by providing the upper face of a laminate with five V-notches as in FIG. 14A, "outfolding" the middle notch as indicated by the arrow F, "infolding" the two adjacent notches as indicated by the arrows G, and finally "infolding" the two outer notches as indicated by the arrows H, a pitched roofing panel as illustrated in FIG. 14B is obtained. If the original laminate shown in FIG. 14A has a width of about 48", the five folds may reduce its width (in its final form, as shown in FIG. 14B) to about 36", but with a foam thickness of 1½ ins., the pitched panel of 14B, which has a stiffness of up to 1000 times that of its separate parts, can be used in 20 ft. spans under normal loadings.

(c) Ducts and containers

Obviously, the foldable laminates according to the present invention give rise to a vast range of internally fireproof and insulated ducts or the like such as that illustrated in FIG. 15 wherein the laminate is infolded four times about four V-notches 7 and closed by ay convenient means at 19. The foldable laminates would normally be sold and delivered as flat sheets, and it would normally be the purchaser or user who would carry out the necessary folding as, when, and where he desires.

(d) Cross-glued double rigid V-notched laminates

As illustrated in FIG. 16, a pair of V-notched laminates in accordance with the present invention may be glued, or otherwise secured, back-to-back by their faces 5, and with their respective V-notches 7 runing at an angle, for example at right angles, to each other. Such a panel would be useful in insulated vehicle walls and roofs, since they would be rib-stiffened on both faces; furthermore, the double panel of FIG. 16 lends itself to changes of plane and even to curved wall or roof structures, depending upon the shape, direction and disposition of the V-notches 7 on the two opposing faces. The double panels illustrated in FIG. 16 also lend themselves to box fabrication.

I claim:

1. A process for the manufacture of hinged and foldable foam laminates capable of outfolds of up to 180° and infolds of up to 120° comprising a rigid layer of foam confined between two skins, which process comprises passing a first flexible skin through guiding means under a foam dispenser, depositing a layer of nascent foam on said first skin, causing said foam layer to rise while travelling with said first skin, to adhere to it and to set to such consistency that essentially it ceases to flow under the force of gravity, inverting said first skin-and-foam-layer laminate while the foam is still tacky and impressing the tacky foam surface onto a second skin in close proximity to and underneath the first skin-foam laminate, said second skin comprising a sheet material provided with at least one upstanding notch of inverted V-shape of up to 120° between its two outer edges, the apex of said inverted V extending to below said first flexible skin, and causing said foam to fully cure and bond to both skins whereby the apex of the inverted V-shaped notch forms a hinge and allows folding.

2. A process as claimed in claim 1, wherein said foamed synthetic polymer is foamed polyurethane.

3. A process as claimed in claim 1, wherein the angle subtended by said inverted V-shaped notch does not exceed 120°.

4. A process as claimed in claim 3, wherein the angle subtended by said inverted V-shaped notch does not exceed 90°.

5. A process as claimed in claim 1, wherein said inverted V-shaped notch extends longitudinally with respect to the length of the laminate.

6. A process as claimed in claim 1, wherein said inverted V-shaped notch extends transversely with respect to the length of the laminate.

7. A process as claimed in claim 1, wherein said inverted V-shaped notch extends at an angle other than a right angle with respect to the length of the laminate.

8. A process as claimed in claim 1, wherein said second skin is a substantially rigid sheet material preformed with said inverted V-shaped notch therein.

9. A process as claimed in claim 1, wherein said second skin is a substantially rigid sheet material and which comprises the step of imparting said inverted V-shaped notch thereto by means of a crimping tool just prior to the application of the foam to said second skin.

10. A process as claimed in claim 1, wherein said second skin is a flexible sheet material and which comprises the step of feeding said second skin to the process so that it rests lightly upon an endless belt which is provided on its surface with upstanding triangular ridges so that when the foam is applied to said second flexible skin it is caused to conform to the surface shape of the belt whose upstanding triangular ridges simultaneously impart an inverted V-shaped notch to said second flexible skin and cause it to slice upwardly through the foam.

11. A process for the manufacture of a folded foam laminate which comprises the steps of manufacturing a foldable foam laminate by the process claimed in claim 1, and thereafter folding said laminate in a hinge-like manner about the apex of said inverted V-shaped notch.

12. A process for the continuous manufacture of hinged and foldable foam laminates capable of outfolds of up to 180° and infolds of up to 120° consisting of a rigid layer of foam confined between two skins, which process comprises passing a first flexible skin continuously through guiding means underneath a foam dispenser, depositing a layer of nascent foam on said first skin, causing said foam layer to rise while travelling with said first skin, to adhere to it and to set to such consistency that essentially it ceases to flow under the force of gravity, inverting said first skin-and-foam layer laminate while the foam is still tacky and impressing the tacky foam onto a second skin travelling at the same speed and in the same direction as and in close proximity to and underneath the inverted first skin-foam laminate, said second skin comprising a sheet provided with at least one upstanding notch of inverted V-shape of up to 120° between its two outer edges, the apex of said inverted V extending to below the top of said layer of foam, and causing said foam to fully cure and bond to both skins whereby the apex of the inverted V-shaped notch forms a hinge and allows folding.

References Cited

UNITED STATES PATENTS

| | | | |
|---|---|---|---|
| 2,348,703 | 5/1944 | Weir et al. | 156—257 |
| 1,730,090 | 10/1929 | O'Brien | 161—134 |
| 2,011,468 | 8/1935 | Bronson | 161—121 |
| 2,956,310 | 10/1960 | Roop et al. | 156—79 |
| 3,174,887 | 3/1965 | Voelker | 156—79 |
| 3,203,144 | 8/1965 | Fuller | 52—615 X |
| 3,235,440 | 2/1966 | Gould | 161—119 |

FOREIGN PATENTS

| | | | |
|---|---|---|---|
| 1,053,192 | 12/1966 | Great Britain | 156—257 |
| 275,709 | 9/1951 | Switzerland | 156—257 |
| 7,949 | 6/1907 | Great Britain. | |

WILLARD E. HOAG, Primary Examiner

U.S. Cl. X.R.

156—204, 242, 306, 324; 161—99, 119, 121, 133; 229—DIG. 4; 264—45